US008942706B2

(12) United States Patent
Lindoff et al.

(10) Patent No.: US 8,942,706 B2
(45) Date of Patent: Jan. 27, 2015

(54) ROBUST RADIO RESOURCE CONTROL SIGNALING FOR HSDPA

(75) Inventors: Bengt Lindoff, Bjärred (SE); Johan Nilsson, Höllviken (SE); Per Synnergren, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2633 days.

(21) Appl. No.: 11/286,973

(22) Filed: Nov. 23, 2005

(65) Prior Publication Data

US 2007/0049278 A1 Mar. 1, 2007

Related U.S. Application Data

(60) Provisional application No. 60/712,508, filed on Aug. 30, 2005.

(51) Int. Cl.
*H04W 36/00* (2009.01)
*H04W 36/02* (2009.01)

(52) U.S. Cl.
CPC ........ *H04W 36/0055* (2013.01); *H04W 36/026* (2013.01)
USPC ...................... 455/437; 455/432.1; 455/435.1; 455/436; 455/439; 455/440; 370/331; 370/332; 370/333; 370/334

(58) Field of Classification Search
USPC ...................... 455/436, 437, 439, 452.2, 453; 370/331, 332, 333, 334
See application file for complete search history.

(56) References Cited

U.S. PATENT DOCUMENTS

| 5,901,354 | A | | 5/1999 | Menich et al. | |
|---|---|---|---|---|---|
| 5,926,469 | A | * | 7/1999 | Norstedt et al. | 370/329 |
| 6,055,427 | A | | 4/2000 | Ojaniemi | |
| 6,438,378 | B1 | * | 8/2002 | Kouno | 455/439 |
| 6,631,263 | B1 | * | 10/2003 | Corkery | 455/436 |
| 7,260,398 | B2 | * | 8/2007 | Igarashi et al. | 455/436 |

(Continued)

FOREIGN PATENT DOCUMENTS

| EP | 1 207 711 | 5/2002 |
|---|---|---|
| EP | 1 223 769 | 7/2002 |

(Continued)

OTHER PUBLICATIONS

"Enhanced HSDPA Re-pointing Scheme," 3GPP TSG-RAN WG2 meeting #48; London, UK, Aug. 29-Sep. 2, 2005;8 pages; http://www.3gpp.org/ftp/tsg_ran/WG2_RL2/TSGR2_48/Documents/R2-051969.zip.

*Primary Examiner* — Dai A Phuong
(74) *Attorney, Agent, or Firm* — Coats and Bennett, PLLC

(57) ABSTRACT

A radio network controller is operable in both a unicast signaling mode and a bi-cast signaling mode. In unicast signaling mode, the radio network controller is operable to send radio resource control signals to a mobile station through a serving cell. The radio network controller is operable to go into bi-cast signaling mode during a hard handover. In the bi-cast signaling mode, the radio network controller is operable to send radio resource control messages to the mobile station through both the current serving cell and a target cell. The mobile station is configured to listen to both the current serving cell and the target cell for radio resource control messages. User data, however, is transmitted only from the current serving cell to the mobile station.

32 Claims, 4 Drawing Sheets

(56) References Cited

U.S. PATENT DOCUMENTS

| | | | |
|---|---|---|---|
| 2002/0145991 A1* | 10/2002 | Miya et al. | 370/337 |
| 2003/0006387 A1 | 1/2003 | Marie et al. | |
| 2004/0053615 A1* | 3/2004 | Kim et al. | 455/436 |
| 2004/0185905 A1* | 9/2004 | Tanoue | 455/560 |
| 2005/0078648 A1 | 4/2005 | Nilsson | |
| 2005/0286470 A1* | 12/2005 | Asthana et al. | 370/331 |
| 2006/0240831 A1* | 10/2006 | Toskala et al. | 455/436 |
| 2006/0286983 A1* | 12/2006 | Otsuka et al. | 455/444 |

FOREIGN PATENT DOCUMENTS

| | | |
|---|---|---|
| EP | 04029822.6 | 12/2004 |
| EP | 1 494 371 | 1/2005 |
| JP | 9162800 A | 6/1997 |
| JP | 2000217139 A | 8/2000 |
| WO | 98/06230 A2 | 2/1998 |

\* cited by examiner

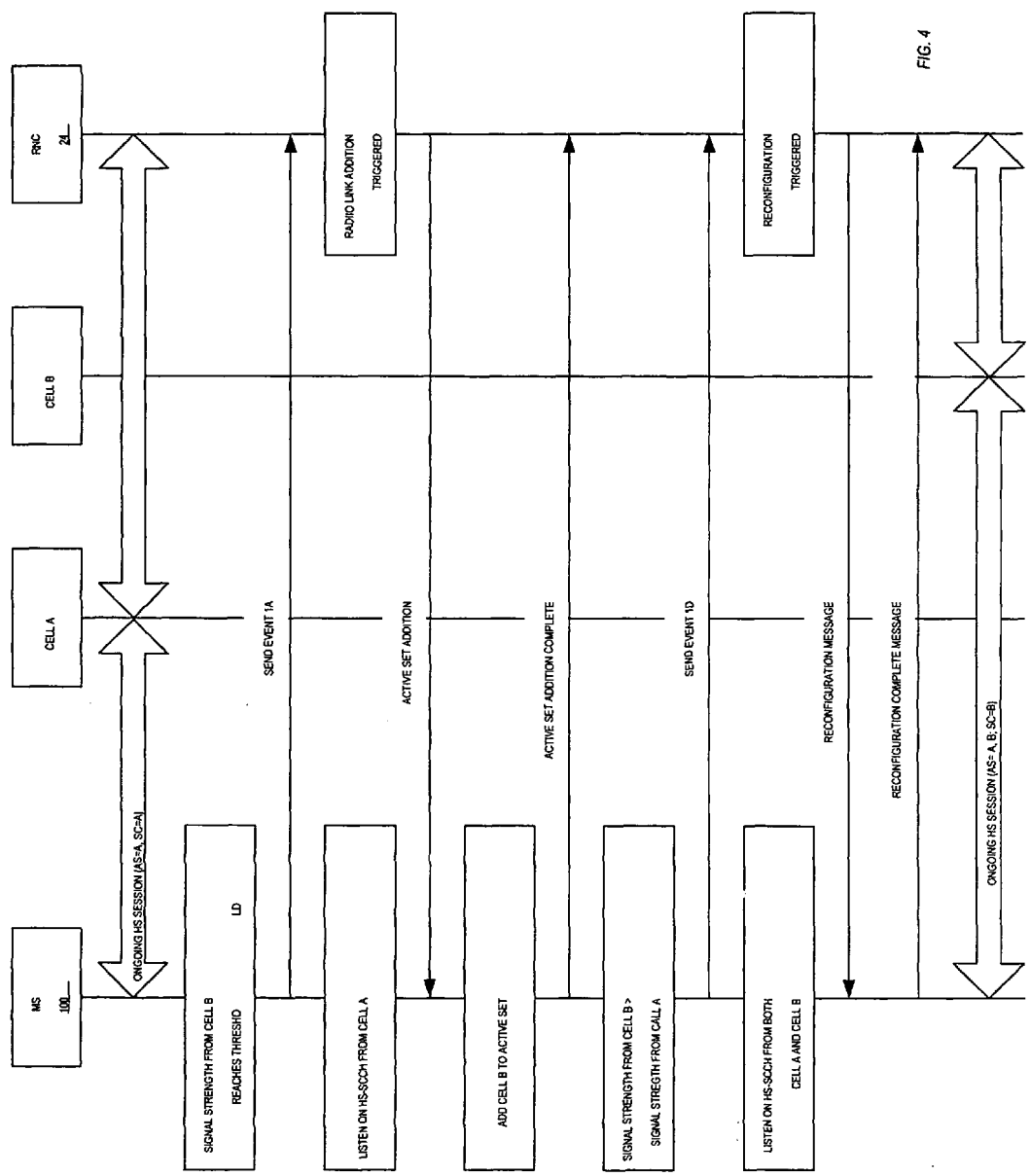

ROBUST RADIO RESOURCE CONTROL SIGNALING FOR HSDPA

This application claims priority from U.S. Provisional Patent Application 60/712,508 filed Aug. 30, 2005, which is incorporated herein by reference.

BACKGROUND

The present invention relates generally to Code Division Multiple Access (CDMA) systems, and more particularly, to radio resource management for a shared downlink traffic channel in CDMA systems.

High Speed Downlink Packet Access (HSDPA) is packet data service offered in Wideband Code Division Multiple Access (WCDMA) networks. The HSDPA is an evolution of WCDMA specified by the Third Generation Partnership Project (3GPP) in Release 99 of the WCDMA standard. The HSDPA, introduced in Release 5 of the WCDMA standard, provides peak data rates up to 10 Mbits/s using enhanced features such as higher-order modulation (16 QAM), physical layer retransmission with soft combining hybrid automatic repeat request (H-ARQ), multicode transmission, fast link adaptation, and fast scheduling. The transport channel for HSDPA is the High Speed Downlink Shared Channel (HS-DSCH). The HS-DSCH is carried over the High Speed Physical Downlink Shared Channel (HS-PDSCH).

The HS-DSCH is a time multiplexed channel shared by a plurality of mobile stations. Mobile stations are scheduled to receive data on the HS-PDSCH by a serving base station. The scheduling interval is referred to as a Transmission Time Interval (TTI). During a given TTI, one or more mobile stations may be scheduled. The mobile stations report channel conditions to the base station on an uplink channel called the High Speed Dedicated Physical Control Channel (HS-PDSCH) to enable the base station to make scheduling decisions. The base station schedules the mobile station based, at least in part, on the reported channel conditions. The identity of the mobile stations scheduled to receive packet data on the HS-DSCH in a given TTI is transmitted on the High Speed Shared Control Channel (HS-SCCH). The HS-SCCH is also used to send transmission parameters needed by the mobile station to decode the HS-DSCH, such as the code channels, the transport block size, and the modulation scheme used in the corresponding TTI.

Unlike Dedicated Physical Channels (DPCH) in WCDMA specified by Release 99 of the WCDMA standard, soft handoff is not supported for the downlink when using HSDPA. Due to the complexity of coordinating packet data transmissions between cells, hard handover (HHO) is used. The mobile station measures instantaneous Signal-to-Interference ratio, $E_c/I_o$, which in WCDMA is defined as RSCP/RSSI where RSCP is the received signal CPICH code power and RSSI is the received signal strength indicator of a pilot signal received from each cell in its active set and requests service from the cell providing the strongest signal. As the mobile station moves into a boundary zone between cells, the signal strength from the serving cell will diminish while the signal strength from a neighboring cell in its active set will increase. When the signal strength from the neighboring cell exceeds the signal strength from the current serving cell, the mobile station requests a handover from the current serving cell to a specified target cell. When the current serving base station acknowledges the handover request, the mobile station switches to the target cell and sends a handover complete message to both the serving base station and the target base station to complete the handover. The target base station assumes the role as the serving base station and begins transmitting packet data to the mobile station. The HS-DSCH according to Release 5 of the WCDMA standard, always operates in conjunction with an Associated Dedicated Physical Channel (A-DPCH). The A-DPCH carries Radio Resource Control (RRC) messages between the mobile station and the base station. Radio resource control is a protocol that provides control of the mobile station by a radio network controller in a radio access network. The RRC functions include control of handover control of the mobile station in connected mode.

Release 6 of the WCDMA standard allows a serving base station to send RRC signaling messages to the mobile station in band over the High Speed Physical Downlink Shared Channel (HS-PDSCH) instead of the A-DPCH. When in band signaling over the HS-PDCH is used, the DPCH is used to carry only power control information and is called a fractional DPCH (F-DPCH).

The handover procedure typically takes about 200-800 ms to complete from the time that the mobile station sends the handover request. The large variation in the handover procedure times depends on channel conditions and on whether the HS-PDSCH or the A-DPCH conveys RRC messages. During the handover procedure time period, the signal quality on the HS-PDSCH from the serving cell may vary significantly. If RRC messages are carried in-band, and if channel conditions deteriorate, the mobile station may not be able to receive RRC messages from the serving base station, which will prevent the mobile station from completing the handover and may result in radio link failure, i.e. a dropped call. Therefore, there is a need to make signaling between the base station and the mobile station more robust, particularly when in band signaling on the HS-DSCH is used to carry RRC messages.

SUMMARY

Embodiments of the present invention provide a robust method for sending Radio Resource Control (RRC) in band over a shared downlink traffic channel to reduce the likelihood of radio link failure and to reduce the number of calls that are dropped. Conventionally, RRC messages are unicast from a Radio Network Controller (RNC) to the mobile station through a current serving base station. The present invention introduces a bi-cast signaling mode for the RNC so that RRC messages may be bi-cast by the RNC through the current serving cell and a target cell during a handover. User data, however, is transmitted only from the serving cell to the mobile station. In one example embodiment, both the current serving base station and the target base station transmit the RRC messages in band over a shared downlink traffic channel rather than a dedicated channel. Bi-casting the RRC messages through both the current serving cell and the target cell increases the likelihood that a mobile station will receive RRC signaling messages when in band signaling is used. When the handover is complete, the RNC reverts back to a unicast signaling mode.

In one example application of the signaling method of the present invention, the bi-cast signaling mode is triggered when the mobile station indicates a need for a handover. When the mobile station sends a handover request to the RNC through the current serving cell to request a handover to a specified target cell, the RNC goes into a bi-cast signaling mode. The RNC uses the bi-cast signaling mode to acknowledge the handover request by the mobile station. The acknowledgement may comprise, for example, a reconfiguration message instructing the mobile station to change to the target cell specified in the handover request. The mobile station also goes into a bi-cast listening mode and listens for the acknowledgement of its handover request in both the current serving cell and the target cell. When the acknowledgement is received, the mobile station switches to the target cell for HSDPA and sends a handover complete message to the RNC. Upon receipt of the handover complete message from the mobile station, the RNC reverts back to unicast signaling mode.

On example embodiment of the invention comprises a method for executing a handover implemented by a radio network controller. The radio network controller triggers a hard handover of a mobile station from a current serving cell to a target cell responsive to a signaling message from the mobile station. During the handover, the radio network controller bi-casts radio resource messages to the mobile station through both the serving cell and the target cell. User data is transmitted only by the serving cell until the handover is complete.

Another example embodiment of the invention comprises a radio network controller for a mobile communication network. The radio network controller comprises a radio resource controller configured to trigger a hard handover from a of a mobile station from a current serving cell to a target cell responsive to a signaling message from the mobile station and to bi-cast radio resource messages to the mobile station through both the serving cell and the target cell during the handover.

Another example embodiment of the invention comprises a mobile station capable of receiving data on a shared downlink traffic channel. The mobile station comprises a transceiver and a control unit. The transceiver transmits and receives data, including radio resource control messages, and the control unit controls the transceiver. According to this example embodiment, the transceiver is configured to send a signaling message to a radio network controller to initiate a hard handover from a current serving cell to a target cell. The transceiver is further configured to listen for a response message to the signaling message from the radio network controller in both the current serving cell and the target cell.

BRIEF DESCRIPTION OF THE DRAWINGS

FIG. 4 is a call flow illustrating example signaling between the mobile station and radio access network during a handover.

DETAILED DESCRIPTION

Figure 1:
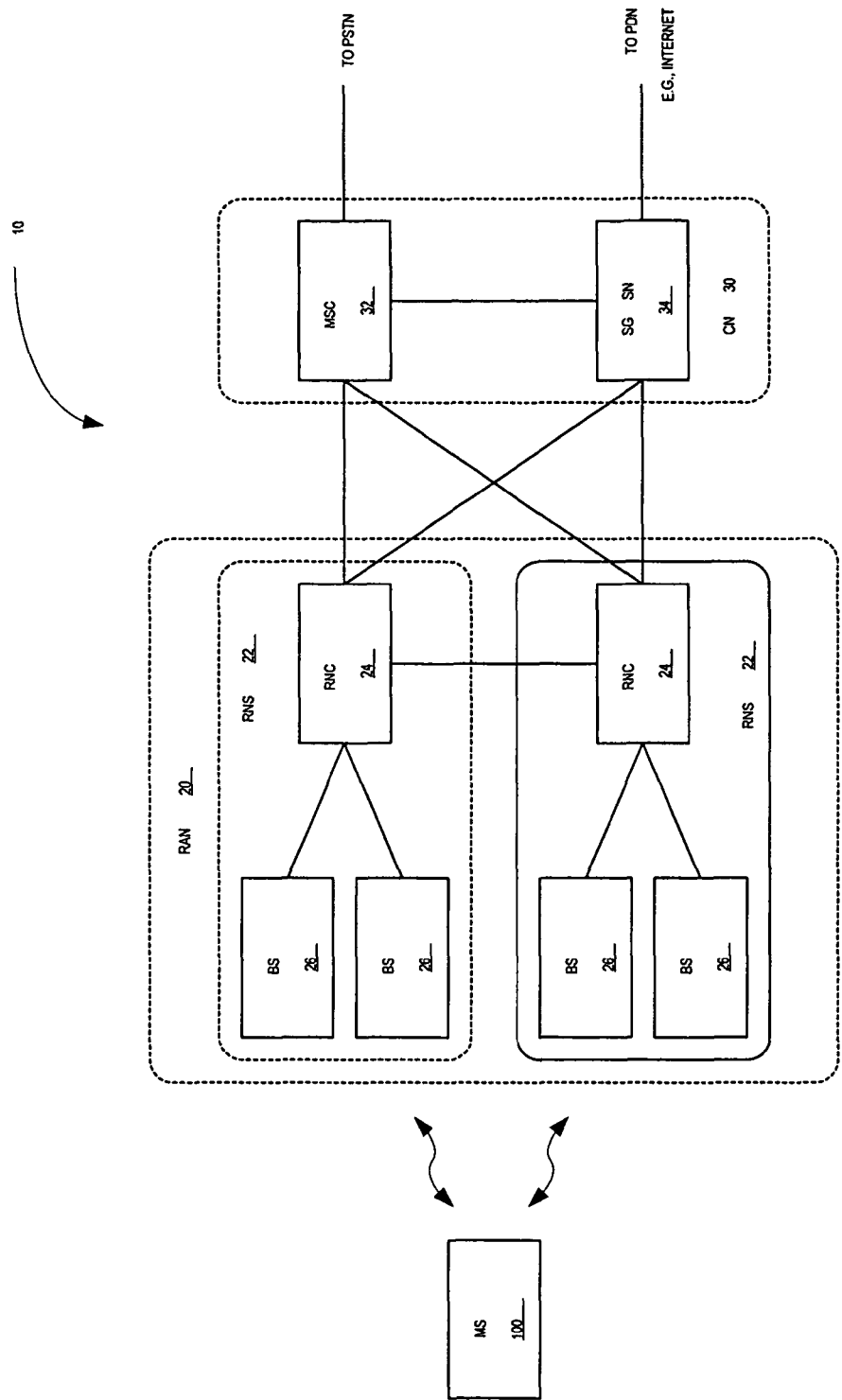
FIG. 1 illustrates an example mobile communication network.

FIG. 1 illustrates an example wireless communication network 10 for providing mobile communication services to one or more mobile stations 100. The term mobile station as used herein refers to any portable communication device having the ability to connect wirelessly to a communication network. The term mobile station includes, without limitation, mobile telephones, pagers, personal digital assistants, and laptop or handheld computers. The example wireless communication network 10 comprises a Wideband Code Division Multiple Access (WCDMA) system as specified by the Third Generation Partnership Project (3GPP). Those skilled in the art will recognize that the present invention may also be used in mobile communication networks based on other standards, such as cdma2000 (TIA-2000), 1xEV-DO (TIA-856a), and WiMAX (IEEE 802.16).

Wireless communication network 10 comprises a core network (CN) 30 connecting to one or more external packet data networks, such as the Internet, and one or more radio access networks (RANs) 20. The core network 30 is responsible for switching and routing of calls between the mobile stations 100 and external networks. The core network 30 may include a Mobile switching Center (MSC) 32 for providing circuit-switched services and a Serving GPRS Support Node (SGSN) 34 for providing packet switched services. The main function of the RAN 20 is to provide mobile stations 100 with access to the core network 30. The RAN 20 includes one or more radio network sub-systems (RNSs) 22. An RNS 22 comprises a radio network controller (RNC) 24 and one or more base stations (BSs) 26, referred to in the WCDMA standards as Node Bs. This application uses the generic term base station (BS) instead of the WCDMA-specific term Node B.

The BSs 26 communicate with the mobile stations 100 over the air interface and are normally associated with a cell. A BS 26 may provide service in more than one cell. The RNC 24 is the network component that connects the RAN 20 to the core network 30 and controls RAN functions. The RNC 24 manages BSs 26 and radio resources within its domain and terminates Radio Resource Control (RRC). RRC is a protocol that provides control over the mobile station by the RNC 24. The RRC functions performed by the RNC 24 include measurement reporting, active set management and handover control.

High Speed Downlink Packet Access (HSDPA) is one method implemented by the wireless communication network 10 to deliver packets on the downlink to the mobile station 100. HSDPA is an evolution of the Downlink Shared Channel (DSCH) in prior versions of the WCDMA standard. HSDPA was introduced in Release 5 of the WCDMA standard. The main purpose of HSDPA is to increase data throughput using enhancements such as fast scheduling, fast link adaptation, physical layer automatic repeat request (HARQ), smaller packet size, and multi-code transmission. HSDPA takes advantage of the bursty nature of packet data to share the available radio resources among a plurality of users and thereby make more efficient use of those resources.

HSDPA provides a new transport channel for high speed packet delivery on the downlink called the High Speed Downlink Shared Channel (HS-DSCH) and two new downlink physical channels: the High Speed Physical Downlink Shared Channel (HS-PDSCH) to carry user data, and the High Speed Shared Control Channel (HS-SCCH) to carry downlink signaling for identifying the mobile station being scheduled and for indicating the transmission parameters needed by the mobile station to decode the HS-PDSCH. HS-PDPA also adds one uplink channel called the High Speed Dedicated Physical Control Channel (HS-PDSCH) to carry uplink signaling, such as ACK/NACK (acknowledgement/non-acknowledgement) signaling for H-ARQ operation and Channel Quality Indications (CQI) for scheduling and rate control. HSDPA according to Release 5 of the WCDMA standard always operates in conjunction with a corresponding Associated Dedicated Physical Channel (A-DPCH). The A-DPCH is used to send power control commands and may also be used to send RRC signaling to the mobile station 100. Release 6 of the WCDMA standard allows a serving base station to send RRC signaling messages to the mobile station in band over the High Speed Physical Downlink Shared Channel (HS-PDSCH) instead of the A-DPCH, and in that case, the DPCH is used only for carrying power control information and is called a fractional DPCH (F-DPCH).

Transmissions on the HS-DSCH are divided into 2 ms units of time called a Transmission Time Interval (TTI). A TTI is further divided into 3 timeslots of 0.667 ms each. A TTI is the basic unit of time used to schedule mobile stations 100 on the HS-DSCH. Scheduling is a function performed by a scheduler located in the serving BS 26. The scheduler at the serving BS 26 determines which mobile stations 100 shall receive data in each TTI based on factors such as the channel conditions reported by each mobile station 100, the amount of data pending in the buffer for each mobile station 100, the average throughput to each mobile station 100, and any Quality of Service (QoS) guarantees. The scheduling algorithm is typically determined by the network operator. During any given TTI, the BS 26 allocates up to 15 channelization codes to one or more mobile stations 100.

The BS 26 identifies the mobile station(s) 100 being scheduled, the code allocations, and the transmission format via the HS-SCCH. The HS-SCCH is a fixed rate channel (60 kbps, spreading factor=128) used to transmit downlink signaling before the start of a corresponding TTI. The HS-SCCH is divided into two parts. Part 1 carries critical information needed by the mobile station to begin demodulation of the HS-DSCH. Part 2 carries less critical information, such as a Cyclic Redundancy Check (CRC) and HARQ process information. The BS 26 transmits the HS-SCCH two timeslots before the start of the corresponding TTI. Both parts are transmitted with a mobile station specific mask that identifies the mobile station 100 scheduled in the corresponding TTI.

The HS-DPCCH is an uplink channel that carries signaling associated with HSDPA operations. The mobile station 100 uses the HS-DPCCH to send a Channel Quality Indicator (CQI) to the BS 26. The BS 26 uses the CQI to make scheduling decisions. The mobile station 100 also uses the HS-DPCCH to send an ACK/NACK indicator to the BS 26 for HARQ operations to indicate whether transmitted packets were successfully received.

The mobile station 100 monitors the HS-SCCH to determine when it is scheduled to receive packet data on the HS-PDSCH. More particularly, the mobile station 100 decodes Part 1 of each HS-SCCH to determine if it has been scheduled for the corresponding TTI. When the mobile station 100 is scheduled in the corresponding TTI, it also decodes Part 2 of the HS-SCCH and begins decoding the HS-PDSCH at the start of the designated TTI. After decoding the HS-PDSCH, the mobile station 100 sends an ACK/NACK indicator to the BS 26 on the HS-DPCCH to indicate whether the packet data was successfully received.

Due to the complexity of coordinating downlink transmissions on the HS-DSCH in different cells, soft handoff is not employed on the HS-DSCH when the mobile station 100 moves between cells. Instead, a hard handover is used. The RNC 24 is responsible for controlling handovers. Handover control is part of the RRC function performed by the RNC 24.

The mobile station 100 measures the instantaneous Signal-to-Interference ratio, $E_c/I_o$ of the pilot signal received from each cell in its active set and requests service from the cell providing the strongest signal. As the mobile station 100 moves into a boundary zone between cells, the signal strength from the serving cell will diminish while the signal strength from a neighboring cell in its active set will increase. When the signal strength from the neighboring cell exceeds the signal strength from the current serving cell, the mobile station 100 sends a handover request to the RNC 24 through the current serving cell. The handover request identifies a target cell for the handover. The RNC begins a reconfiguration process to reroute the packet data to the target cell and, in conventional systems, sends a reconfiguration message back to the mobile station 100 through the current serving BS 26. Upon receipt of the reconfiguration message, the mobile station 100 switches to the target cell and sends a handover complete message to the RNC 24 through the target cell to complete the handover. The BS 26 for the target cell assumes the role as the serving BS 26 and begins transmitting packet data to the mobile station 100 on the HS-PDSCH.

The signaling messages between the mobile station 100 and RNC 24 used to execute a handover are part of the RRC (Layer 3) signaling. In Release 6 of the WCDMA standard, RRC signaling from the RNC 24 to the mobile station may be transmitted either in band over the HS-PDSCH or over the associated DPCH. The possibility of using in band RRC signaling on the HS-PDSCH was introduced in Release 6 of the WCDMA standard to reduce the radio resources dedicated for signaling. By using in band signaling, the amount of base station power allocated to the A-DPCH is reduced thereby increasing the power available for the HS-PDSCH.

One potential problem with in band signaling on the HS-DSCH is packet loss due to deteriorating signal quality. When the mobile station 100 is operating in a boundary region between two cells, the signal quality from the current serving BS 26 may fluctuate significantly. The handover procedure typically takes about 200-800 ms to complete from the time that the mobile station 100 indicates the need for a handover. If conditions deteriorate after the handover procedure is initiated, the mobile station 100 may not be able to receive the RRC signaling from the serving BS 26, which will prevent the mobile station 100 from completing the handover. RRC signaling for executing a handover is referred to herein as handover signaling. If the mobile station 100 cannot complete the handover, conditions may deteriorate to the point that the call is dropped.

To avoid a link failure during a handover, the RNC 24 may go into a bi-cast signaling mode during a handover according to an embodiment of the invention. In the bi-cast signaling mode, the RNC 24 bi-casts RRC signaling to the mobile station 100 through both the current serving BS 26a and the target BS 26b during a handover. To save cell capacity, user data, however, is transmitted from the current serving BS 26a. After sending a handover request to the RNC 24 to initiate a handover, the mobile station 100 monitors the HS-SCCH for both the current serving BS 26a and the target BS 26b for an acknowledgement of the handover request. In WCDMA systems, the acknowledgement may comprises a handover command, referred to in WCDMA as a reconfiguration message. If the mobile station 100 detects a packet for the mobile station 100 on the HS-SCCH from either one of the BSs 26, the mobile station begins decoding the packet on the HS-PDSCH from the BS sending the packet. If the packet contains a reconfiguration message from the RNC 24, the mobile station 100 switches to the target BS 26b and sends a handover complete message, referred to in WCDMA as a reconfiguration complete message, to the RNC 24 via the target BS 26b to complete the handover. When the handover is complete, the target BS 26b becomes the serving BS 26a and begins transmitting forward link packet data to the mobile station 100. By bi-casting messages to the mobile station 100 from both the current serving BS 26a and the target BS 26b, there is a greater probability that the mobile station 100 will correctly receive the reconfiguration message, and hence a lower likelihood of link failure or a dropped call. There may be times when the RNC 24 decides to switch the packet data transmission to a BS 26 other than the one the mobile station 100 indicated in its handover request, i.e., when the RNC 24 moves mobile station 100 to another carrier frequency or when cell B has high load conditions. In other words, RNC 24 can veto the mobile station's selection. In this scenario, RNC 24 still bi-casts the RRC signaling from both the serving BS 26a and the target BS 26b during handover. Mobile station 100 should also bi-listen the source cell (A) and the target cell (B) in the handover request. However, if the reconfiguration message indicates a move to yet another (third) cell different from cell B, or indicates that mobile station 100 should stay in the serving cell (A), then mobile station 100 performs that transition in the actual handover.

Figure 2:
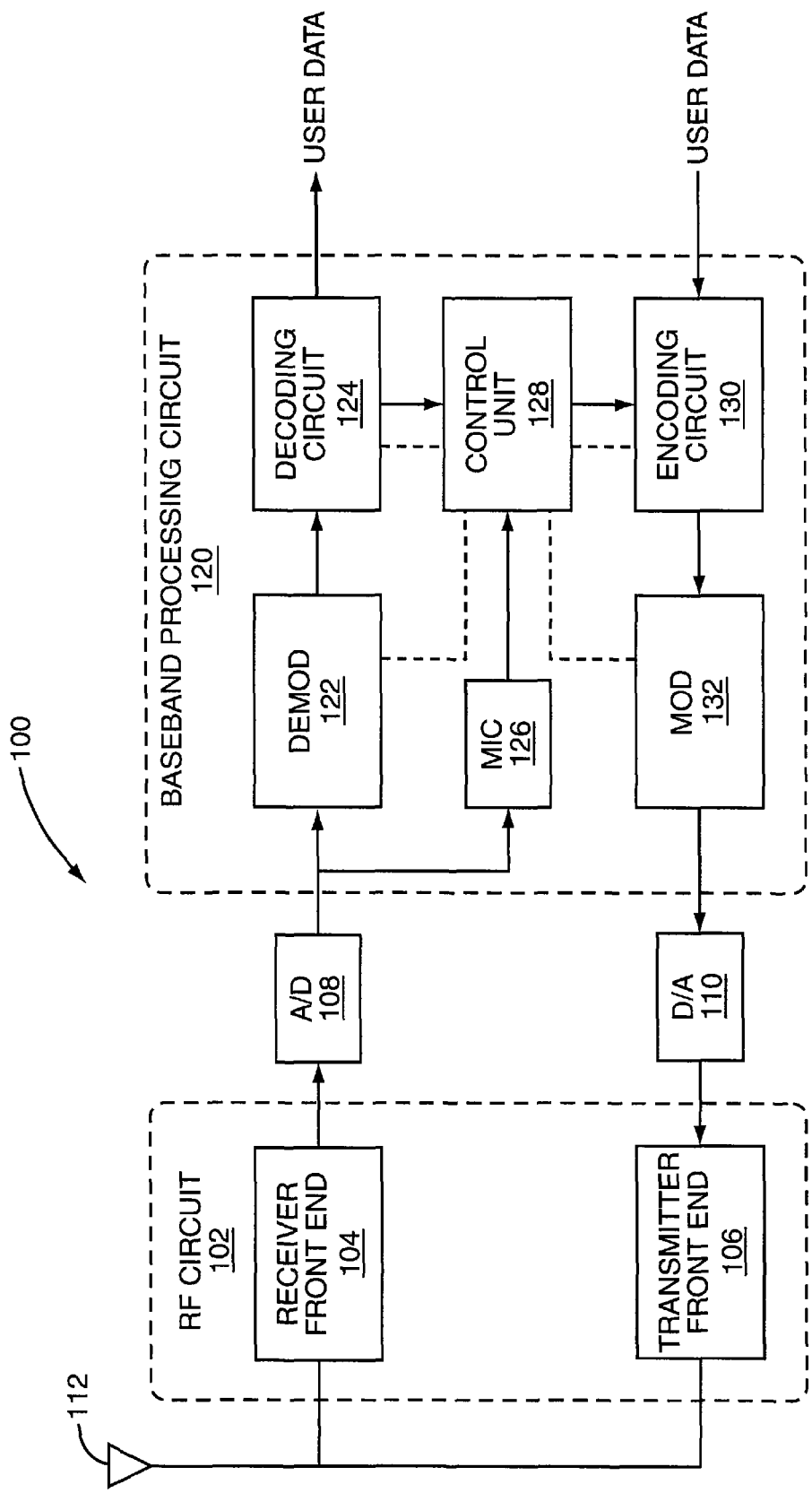
FIG. 2 illustrates an example mobile station.

FIG. 2 illustrates an example mobile station 100 according to the present invention. Mobile station 100 comprises a radio frequency (RF) circuit 102 coupled to one or more antennas 112 and baseband processing circuits 120. The RF circuit 102 comprises a receiver front end 104 and transmitter front end 106. Receiver front end 104 filters, amplifies, and downconverts the received signal. Analog-to-digital converter 108 converts the received signal to a digital signal suitable for processing by the baseband processing circuit 120. On the transmit side, digital-to-analog converter 110 converts transmit signals output from the baseband processing circuit 120 to analog signals suitable for transmission. Transmitter front end 106 modulates the analog transmit signals onto an RF carrier for transmission.

Baseband processing circuit 120 comprises a demodulator 122, decoding circuit 124, measurement circuit 126, control unit 128, encoding circuit 130, and modulator 132. Demodulator 122 demodulates signals received over the air interface to the mobile station 100 and supplies the demodulated signals to the decoding circuit 124. Demodulator 122 may, for example, comprise a RAKE receiver or chip equalization receiver. Decoding circuit 124 performs channel decoding and separates user data from control signaling. The control signaling is passed to control unit 128, which controls the overall operation of the mobile station 100. The control unit 128, which may comprise one or more processors, handles layer 2 and layer 3 signaling and outputs control signals to control operation of the mobile station 100. The control signals, shown in dotted lines, control the demodulator 122, decoding circuit 124, encoding circuit 130, and modulator 132. Measurement circuit (MIC) 126 performs measurements on the received signal and provides its signal quality measurements to the control unit 128. Encoding circuit 130 performs channel coding of user data and control signaling. Modulator 132 digitally modulates the signals output from the encoding circuit 130 to generate a transmit signal that is applied to the digital-to-analog converter 110.

It will be appreciated that elements or components of the mobile station 100, such as the baseband processing circuit 120, may be implemented using a variety of hardware and software. For example, the baseband processing circuit 120 may be implemented using special-purpose hardware, such as an application specific integrated circuit (ASIC) and programmable logic devices such as gate arrays, and/or software or firmware running on a computing device such as a microprocessor, microcontroller or digital signal processor (DSP). Further, it will be appreciated that the functions of the baseband processing circuit 120 may be integrated in a single device, such as a single ASIC or microprocessor, they may also be distributed among several devices.

Figure 3:
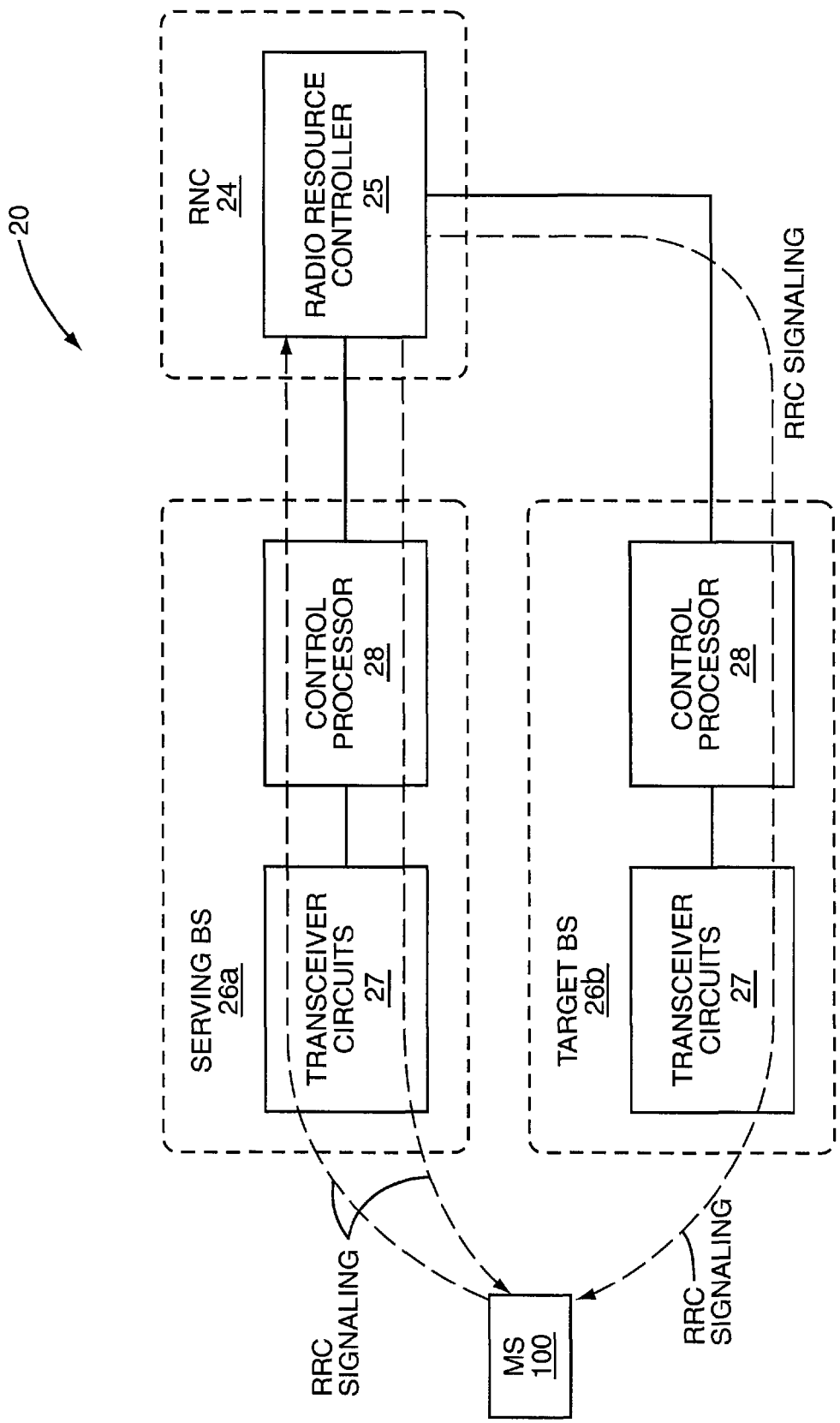
FIG. 3 illustrates an example radio access network.

FIG. 3 illustrates the network components in the RAN 20 involved in a handover according to the embodiments. The mobile station 100 is in a boundary region between serving and target base stations denoted respectively by reference numerals 26a and 26b. Each BS 26a, 26b includes transceiver circuits 27 for communicating with the mobile station 100 over an air interface and a control processor 28 for controlling the BS 26a, 26b. Each BS 26a, 26b connects to a radio network controller 24 which includes a radio resource controller 25. The dotted lines in FIG. 3 illustrate radio resource control signaling between the BSs 26a, 26b and the RNC 24. On the uplink, the mobile station 100 sends radio resource control signaling to the RNC 24 through the serving BS 26a and the target BS 26b. Radio resource control signaling from the RNC 24 to the mobile station 100 may be unicast or bi-cast by the RNC 24. In unicast mode, the RNC 24 sends radio resource control signaling through the serving BS 26a to the mobile station 100. In bi-cast mode, the RNC 24 bi-casts the radio resource control signaling through both the serving and target BSs 26a, 26b. As will be described in greater detail below, the bi-cast mode may be used when a handover has been triggered to increase the probability that the mobile station 100 will receive the radio resource control signaling. More particularly, the RNC 24 may bi-cast a handover command or reconfiguration message instructing the mobile station 100 to change cells. The bi-cast signaling mode may be triggered by a handover request from the mobile station 100, or by a signal strength measurement report indicating the need for a handover. The user data is transmitted from the serving cell only in both uni-cast mode and bi-cast mode.

It will be appreciated that the BS 26 and RNC 24 may be implemented using a variety of hardware and software. For example, elements and components of the BS 26 and RNC 24 may be implemented using special-purpose hardware, such as an application specific integrated circuit (ASIC) and programmable logic devices such as gate arrays, and/or software or firmware running on a computing device such as a microprocessor, microcontroller or digital signal processor (DSP). Further, it will be appreciated that the elements and components of the BS 26 and RNC 24 may be integrated in a single device, such as a single ASIC or microprocessor, or may also be distributed among several devices. Also, it will be appreciated that the BS 26 and RNC 24, while shown as separate nodes, by be integrated in a single node.

FIG. 4 is a call flow diagram illustrating an example handover according to the embodiments. In the example illustrated in FIG. 4, the mobile station 100 is involved in an ongoing high speed packet data session with cell A as the serving cell (SC) (step a). At this point, the active set (AS) for the mobile station 100 consists of cell A. While the mobile station 100 is operating on the HS-DSCH, the mobile station 100 monitors the signal strength from the cells in its active set. Additionally, the mobile station 100 monitors the signal strength from one or more neighboring cells which, in this example, includes cell B. When the signal strength from cell B reaches a predetermined threshold (step b), the mobile station 100 sends an event notification (addition of a cell to the AS is denoted Event 1A in WCDMA), as an RRC message to the radio network controller 24 (step c). The event notification triggers a radio link addition procedure at the radio network controller 24, and the mobile station 100 listens on the HS-SCCH for RRC messages from the RNC 24 (step d). RNC 24 sends an active set addition message to the mobile station 100 (step e). RNC 24 also sends a confirmation message to the BS 26 in cell B including necessary information for the BS 26 in cell B to set up the connection to the mobile station 100. This information includes the identity of the MS 100, the HS-SCCH scrambling codes being used, etc. The mobile station 100 adds cell B to its active set (step f) and sends an active set addition complete message to the RNC 24 (step g). The active set addition message is sent in unicast mode through the serving cell A. When the signal strength from cell B is greater than the signal strength from cell A (step h), the mobile station 100 sends a handover request to the RNC 24 to change the serving cell (step i). The handover request (denoted Event 1D in WCDMA) triggers a radio link reconfiguration at the RNC 24 and the mobile station 100 listens on the HS-SCCH from both cell A and cell B for an acknowledgment of the handover request (step j). The RNC 24 bi-casts a reconfiguration message to the mobile station 100 through both cell A and cell B. User data is still sent through cell A, the serving cell, to the MS. The MS 100 enters bi-listening mode and starts to listen on HS-SCCH from both cell A and B. (step k). Upon receipt of the reconfiguration message from either cell A or B, the mobile station 100 ends the bi-listening mode, switches to the downlink traffic channel in cell B, and sends a reconfiguration complete message to the RNC 24 (step 1). The reconfiguration complete message is transmitted on the uplink dedicated physical data channel (UL-DPDCH) to the base stations 26a and 26b in cells A and B, and decoded by the RNC. The packet data session then continues with cell B as the serving cell (step m).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A signaling method implemented by a radio network controller for executing a hard handover of a mobile station receiving packet data on a shared downlink traffic channel, said method comprising:
   initiating a hard handover of said mobile station from a current serving cell to a target cell responsive to a signaling message from said mobile station;
   bi-casting radio resource control messages to said mobile station through both said current serving cell and said target cell during said handover; and
   uni-casting user data to said mobile station through the current serving cell during said handover.

2. The signaling method of claim 1 wherein said signaling message comprises a handover request.

3. The signaling method of claim 1 wherein said signaling message comprises a signal strength measurement report.

4. The signaling method of claim 1 wherein bi-casting radio resource control messages comprises bi-casting a handover command to said mobile station through both said current serving cell and said target cell.

5. The signaling method of claim 1 wherein bi-casting radio resource control messages comprises transmitting said radio resource control messages to said mobile station in band over said shared downlink traffic channel from both said current serving cell and said target cell.

6. The signaling method of claim 5 wherein said shared downlink traffic channel comprises a High Speed Downlink Shared Channel, HS-DSCH, in a Wideband Code Division Multiple Access, WCDMA, system.

7. A radio network controller for a radio access network, said radio network controller comprising a radio resource controller operative to:
   initiate a hard handover from a current serving cell to a target cell responsive to a signaling message from a mobile station;
   bi-cast radio resource control messages to said mobile station through both said current serving cell and said target cell during said handover; and
   uni-cast user data to said mobile station through the current serving cell during said handover.

8. The radio network controller of claim 7 wherein said signaling message comprises a handover request from said mobile station.

9. The radio network controller of claim 7 wherein said signaling message comprises a signal strength measurement report from the mobile station.

10. The radio network controller of claim 7 wherein the radio resource control messages bi-cast to the mobile station through said current serving cell and said target cell include acknowledgement of a handover request.

11. The radio network controller of claim 7 wherein said radio network controller is operative to bi-cast radio resource control messages to said mobile station in band over a shared downlink traffic channel from both said current serving cell and said target cell.

12. The radio network controller of claim 11 wherein said shared downlink traffic channel comprises a High Speed Downlink Shared Channel, HS-DSCH, in a Wideband Code Division Multiple Access, WCDMA, system.

13. A signaling method implemented by a mobile station for executing a handover in a mobile communication network, said method comprising:
   sending a signaling message to a radio network controller to initiate a hard handover from a current serving cell to a target cell; and
   listening on a downlink channel in both said current serving cell and said target cell for a response message to said signaling message, wherein the response message is bi-cast in both the current serving cell and the target cell.

14. The signaling method of claim 13 wherein the signaling message sent by said mobile station to initiate the hard handover comprises a handover request.

15. The signaling method of claim 13 wherein the signaling message sent by said mobile station to initiate the hard handover comprises a signal strength measurement report.

16. The signaling method of claim 13 wherein listening on a downlink channel in both said current serving cell and target cell for a response message comprises listening to a control channel for both said current serving cell and said target cell.

17. The signaling method of claim 16 further comprising listening to said control channel for both said current serving cell and said target cell to detect a scheduled transmission of said response message on a shared downlink traffic channel.

18. The signaling method of claim 17 further comprising receiving said response message in band over said shared downlink traffic channel.

19. The signaling method of claim 18 wherein said shared downlink traffic channel comprises a High Speed Downlink Shared Channel, HS-DSCH, in a Wideband Code Division Multiple Access, WCDMA, system.

20. The signaling method of claim 13 further comprising sending a confirmation message to said radio network controller upon receipt of said response message.

21. A mobile station capable of receiving data on a shared downlink traffic channel, said mobile station comprising:
   a transceiver to transmit and receive data, including radio resource control messages; and a control unit to control said transceiver, said transceiver configured to:
   send a signaling message to a radio network controller to initiate a hard handover from a current serving cell to a target cell; and
   listen for a response message to said signaling message from said radio network controller on a downlink channel in both said current serving cell and said target cell, wherein the response message is bi-cast in both the current serving cell and the target cell.

22. The mobile station of claim 21 wherein the control unit is configured to send a handover request to the radio network controller to initiate the hard handover.

23. The mobile station of claim 21 wherein the control unit is configured to send a signal strength measurement report to the radio network controller to initiate the hard handover.

24. The mobile station of claim 21 wherein the control unit is configured to listen on a downlink control channel for both said current serving cell and said target cell for said response message.

25. The mobile station of claim 24 wherein the control unit is configured to listen on said downlink control channel for both said current serving cell and said target cell for a scheduled transmission of said response message on a shared downlink traffic channel.

26. The mobile station of claim 25 wherein the mobile station is configured to receive the response message over the shared downlink traffic channel.

27. The mobile station of claim 25 wherein the control unit sends a confirmation message to said radio network controller upon receipt of said response message.

28. A non-transitory computer readable medium storing code for controlling a mobile station, said code including:
   code for causing the mobile station to send a signaling message to a radio resource controller to request a hard handover from a current serving cell to a target cell;
   code for causing the mobile station to listen in both said current serving cell and said target cell for a response to said signaling message, wherein the response message is bi-cast in both the current serving cell and the target cell.

29. The computer readable medium of claim 28 wherein the code for causing the mobile station to listen in both said current serving cell and said target cell for a response to said signaling message causes the mobile station to listen on a control channel in both said current serving cell and said target cell.

30. The computer readable medium of claim 29 wherein the code for causing the mobile station to listen in both said current serving cell and said target cell for a response to said signaling message causes the mobile station to listen to said control channel for a scheduled transmission of said response message on a shared downlink traffic channel.

31. A non-transitory computer readable medium storing code for controlling a radio network controller, said code including:
   code for causing the radio network controller to initiate a hard handover of a mobile station from a current serving cell to a target cell responsive to a signaling message from said mobile station;
   code for causing the radio network controller to bi-cast a radio resource control messages to said mobile station through both said current serving cell and said target cell during said handover;
   code for causing the radio network controller to uni-cast user data to said mobile station through the current serving cell during said handover.

32. The computer readable medium of claim 31 wherein the code for causing the radio network controller to bi-cast radio resource control messages through both said current serving cell and said target cell during said handover causes the radio network controller to bi-cast radio resource control messages using a shared downlink traffic channels in the current serving cell and the target cell.

* * * * *